US012620343B2

(12) United States Patent
Roh et al.

(10) Patent No.: US 12,620,343 B2
(45) Date of Patent: May 5, 2026

(54) DISPLAY PANEL AND DISPLAY DEVICE INCLUDING THE SAME

(71) Applicant: Samsung Display Co., Ltd., Yongin-Si (KR)

(72) Inventors: Jinyoung Roh, Yongin-si (KR); Hae-Kwan Seo, Yongin-si (KR); Bon-Seog Gu, Yongin-si (KR); Jaekeun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/752,712

(22) Filed: Jun. 24, 2024

(65) Prior Publication Data

US 2024/0346991 A1 Oct. 17, 2024

Related U.S. Application Data

(63) Continuation of application No. 18/227,975, filed on Jul. 31, 2023, now Pat. No. 12,020,635.

(30) Foreign Application Priority Data

Dec. 28, 2022 (KR) ........................ 10-2022-0187827

(51) Int. Cl.
*G09G 3/32* (2016.01)

(52) U.S. Cl.
CPC ....... *G09G 3/32* (2013.01); *G09G 2310/0275* (2013.01); *G09G 2310/0297* (2013.01); *G09G 2330/021* (2013.01)

(58) Field of Classification Search
CPC ...... G09G 3/3648; G09G 3/3614; G09G 3/36; G09G 3/3688; G09G 3/20; G09G 3/3655; G09G 3/3677; G09G 3/3607; G09G 3/3233; G09G 3/3266; G09G 3/3696; G09G 3/32; G09G 3/3659; G09G 2300/0426; G09G 2300/0452; G09G 2300/0842; G09G 2330/021; G09G 2310/08; G09G 2310/0297; G09G 2310/061;
(Continued)

(56) References Cited

U.S. PATENT DOCUMENTS

| | | | | |
|---|---|---|---|---|
| 9,659,541 | B2 | 5/2017 | Jin et al. | |
| 2006/0267885 | A1* | 11/2006 | Kwak | G09G 3/3233 345/76 |

(Continued)

FOREIGN PATENT DOCUMENTS

| | | | |
|---|---|---|---|
| KR | 10-2020-0007281 | A | 1/2020 |
| KR | 10-2022-0048519 | A | 4/2022 |

*Primary Examiner* — Dong Hui Liang
(74) *Attorney, Agent, or Firm* — Innovation Counsel LLP

(57) ABSTRACT

A display panel of a display device includes first and second pixel circuits disposed in a first row and connected to 0-th and second data lines, respectively, third and fourth pixel circuits disposed in a second row and connected to first and third data lines, respectively, a first light-emitting area connected to the first pixel circuit via a first connection wiring, a second light-emitting area at least partially overlapping the second pixel circuit and connected to the second pixel circuit, a third light-emitting area at least partially overlapping the third pixel circuit and connected to the third pixel circuit, and a fourth light-emitting area connected to the fourth pixel circuit via a second connection wiring.

20 Claims, 8 Drawing Sheets

(58) Field of Classification Search
CPC ..... G09G 2310/0286; G09G 2310/027; G09G 2320/0233; G09G 2320/0247; G09G 2320/0209; G09G 2320/0252
See application file for complete search history.

(56) References Cited

U.S. PATENT DOCUMENTS

| | | | | |
|---|---|---|---|---|
| 2010/0110114 | A1* | 5/2010 | Hashimoto | G09G 3/3614 345/88 |
| 2015/0380435 | A1 | 12/2015 | Li et al. | |
| 2019/0206346 | A1 | 7/2019 | Xi et al. | |
| 2021/0201785 | A1* | 7/2021 | Kim | H10K 59/131 |
| 2022/0115478 | A1 | 4/2022 | Nam et al. | |
| 2022/0320247 | A1* | 10/2022 | Liu | H10K 59/80515 |

* cited by examiner

DISPLAY PANEL AND DISPLAY DEVICE INCLUDING THE SAME

CROSS-REFERENCE TO RELATED APPLICATIONS

This application is a continuation application of U.S. patent application Ser. No. 18/227,975, filed on Jul. 31, 2023, which claims priority under 35 U.S.C. § 119 to Korean Patent Application No. 10-2022-0187827 filed on Dec. 28, 2022, in the Korean Intellectual Property Office, the disclosures of which are incorporated by reference herein in their entireties.

BACKGROUND

Embodiments of the present disclosure described herein relate to a display device.

In general, a display device includes a display panel for displaying an image and a driver circuit for driving the display panel. The display panel includes a plurality of scan lines, a plurality of data lines, and a plurality of pixels. The driver circuit includes a data driver circuit that outputs a data signal to the data lines, a scan driver circuit that outputs a scan signal to the scan lines, and a drive controller that controls the data driver circuit and the scan driver circuit.

This display device may display an image by outputting the scan signal to a scan line connected to a pixel from which the image is to be displayed, and providing a data voltage corresponding to the image to a data line connected to the pixel.

Further, each of the plurality of pixels may provide one of various color light such as red light, green light, and blue light. Each of the plurality of pixels may include a light-emitting element and a pixel circuit for driving the light-emitting element. A size of each of the plurality of pixels and an arrangement scheme thereof may vary.

SUMMARY

Embodiments of the present disclosure provide a display panel and display device with reduced power consumption.

A first aspect of the present disclosure provides a display panel including 0-th to third data lines, first and second pixel circuits disposed in a first row and connected to the 0-th and second data lines, respectively, third and fourth pixel circuits disposed in a second row and connected to the first and third data lines, respectively, a first light-emitting element connected to the first pixel circuit via a first connection wiring which intersects at least one data line, a second light-emitting element at least partially overlapping the second pixel circuit and connected to the second pixel circuit, a third light-emitting element at least partially overlapping the third pixel circuit and connected to the third pixel circuit, and a fourth light-emitting element connected to the fourth pixel circuit via a second connection wiring which intersects at least one data line, wherein each of the second light-emitting element and the third light-emitting element emits light of the same color, wherein the first light-emitting element, the second light-emitting element, and the fourth light-emitting element respectively emit light of different colors.

In one embodiment, the display panel may further include a demultiplexer configured to connect a 0-th output line to the 0-th data line, and configured to alternately connect a first output line to the first data line and the second data line, and configured to connect a second output line the third data line in response to a switching signal.

In one embodiment, the first light-emitting element may emit first color light, wherein each of the second light-emitting element and the third light-emitting element may emit second color light, wherein the fourth light-emitting element may emit third color light.

In one embodiment, the 0-th output line may transmit a data signal corresponding to the first color light, wherein the first output line may transmit a data signal corresponding to the second color light, and wherein the second output line may transmit a data signal corresponding to the third color light.

In one embodiment, the 0-th data line may transmit a data signal corresponding to the first color light, wherein each of the first data line and the second data lines may transmit a data signal corresponding to the second color light, and wherein the third data line may transmit a data signal corresponding to the third color light.

In one embodiment, the first light-emitting element and the second light-emitting element may be sequentially arranged in the first direction in the first row, wherein the third light-emitting element and the fourth light-emitting element may be sequentially arranged in the first direction in the second row.

In one embodiment, the display panel may further include a fifth data line, a fourth pixel circuit disposed in the first row and connected to the fourth data line, and a fifth light-emitting element a connected to the fifth pixel circuit via a third connection wiring.

In one embodiment, the demultiplexer may be configured to alternately connect the second output line to the third data line and the fourth data line in response to the switching signal.

In one embodiment, the fifth light-emitting element may emit the first color light, wherein the second output line alternately may transmit a data signal corresponding to the third color light and a data signal corresponding to the first color light.

In one embodiment, the first connection wiring may intersect the 0-th data line and the first data line, and wherein the second connection wiring may intersect the second data line and the third data line.

In one embodiment, the first data line may be disposed adjacent to the third pixel circuit and may be disposed on a left side of the third pixel circuit, and wherein the third data line may be disposed adjacent to the fourth pixel circuit and may be disposed on a left side of the fourth pixel circuit.

In one embodiment, each of the first to fourth light-emitting elements may include an anode and a cathode, wherein the first connection wiring may extend from the anode of the first light-emitting element, wherein the second connection wiring may extend from the anode of the fourth light-emitting element.

A second aspect of the present disclosure provides a display device including a display panel, a data driver circuit electrically connected to a 0-th output line, a first output line and a second output line, and a demultiplexer configured to electrically connect the 0-th output line to a 0-th data line, and configured to alternately electrically connect the first output line to a first data line and a second data line, and configured to electrically connect the second output line to a third data line, wherein the display panel includes first and second pixel circuits disposed in a first row and connected to the 0-th and the second data lines, respectively, third and fourth pixel circuits disposed in a second row and connected to the first and the third data lines, respectively, a first light-emitting element connected to the first pixel circuit via a first connection wiring which intersects at least one data line, a second light-emitting element at least partially overlapping the second pixel circuit and connected to the second pixel circuit, a third light-emitting element at least partially overlapping the third pixel circuit and connected to the third pixel circuit, and a fourth light-emitting element connected to the fourth pixel circuit via a second connection wiring which intersects at least one data line, wherein each of the second light-emitting element and the third light-emitting element emits light of the same color, wherein the first light-emitting element, the second light-emitting element, and the fourth light-emitting element respectively emit light of different colors.

In one embodiment, the demultiplexer may be configured to electrically connect the 0-th output line to the 0-th data line, and configured to alternately electrically connect the first output line to the first data line and the second data line, and configured to electrically connect the second output line to the third data line, in response to a switching signal.

In one embodiment, the first light-emitting element may emit first color light, wherein each of the second light-emitting element and the third light-emitting element may emit second color light, wherein the fourth light-emitting element may emit third color light.

In one embodiment, the data driver circuit may be configured to output a data signal corresponding to the first color light to the 0-th output line, and configured to output a data signal corresponding to the second color light to the first output line, and output a data signal corresponding to the third color light to the second output line.

In one embodiment, the 0-th data line may transmit a data signal corresponding to the first color light, wherein each of the first data line and the second data lines may transmit a data signal corresponding to the second color light, wherein the third data line may transmit a data signal corresponding to the third color light.

In one embodiment, the first connection wiring may intersect the 0-th data line and the first data line, wherein the second connection wiring may intersect the second data line and the third data line.

In one embodiment, the first data line may be disposed adjacent to the third pixel circuit and may be disposed on a left side of the third pixel circuit, wherein the third data line may be disposed adjacent to the fourth pixel circuit and may be disposed on a left side of the fourth pixel circuit.

In one embodiment, each of the first to fourth light-emitting elements may include an anode and a cathode, wherein the first connection wiring may extend from the anode of the first light-emitting element, wherein the second connection wiring may extend from the anode of the fourth light-emitting element.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
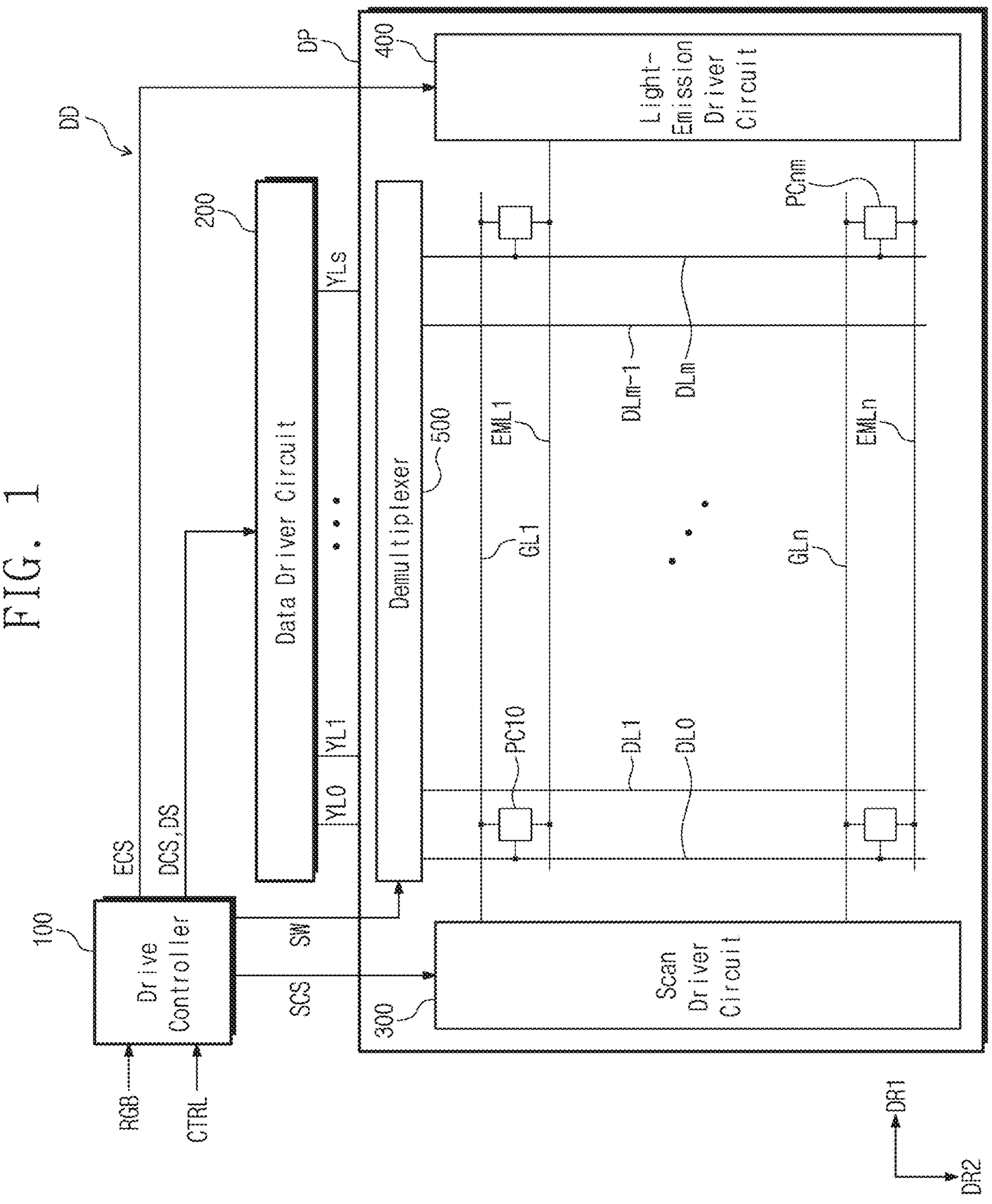
FIG. 1 is a block diagram of a display device according to an embodiment of the present disclosure.

As used herein, when a component or a region, a layer, a portion, etc. is referred to as being "on", "connected to", or "coupled to" another component, it means that the component may be directly disposed/connected/coupled on another component or a third component may be disposed between the component and another component.

Like reference numerals refer to like components. In addition, in the drawings, thicknesses, ratios, and dimensions of components are exaggerated for effective description of technical content. "and/or" includes all of one or more combinations that the associated components may define.

Terms such as first, second, etc. may be used to describe various components, but the components should not be limited by the terms. The above terms are used only for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components illustrated in the drawings. The above terms are relative concepts, and are described with reference to directions indicated in the drawings.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to drawings.

FIG. 1 is a block diagram of a display device according to an embodiment of the present disclosure.

Referring to FIG. 1, a display device DD includes a drive controller 100, a data driver circuit 200, and a display panel DP.

The drive controller 100 receives an input image signal RGB and a control signal CTRL. The drive controller 100 generates an output image signal DS by converting an input image signal RGB into an image type suitable for the display panel DP. The drive controller 100 outputs a switching signal SW, a scan control signal SCS, and a data control signal DCS.

The display panel DP according to an embodiment of the present disclosure may be a light-emitting display panel. For example, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include a quantum dot, a quantum rod, or the like. Hereinafter, in this embodiment, an example in which the display panel DP is embodied as the organic light-emitting display panel is described.

The display panel DP includes scan lines GL1 to GLn, data lines DL1 to DLm, and pixel circuits PC11 to PCnm. Although not shown in FIG. 1, the display panel DP may include a plurality of light-emitting elements. The plurality of light-emitting elements will be described in detail later.

The display panel DP may further include a scan driver circuit 300, a light-emission driver circuit 400 and a demultiplexer 500. Each of the pixel circuits PC11 to PCnm may be electrically connected to the scan driver circuit 300, the light-emission driver circuit 400, and the demultiplexer 500.

The scan lines GL1 to GLn extend from the scan driver circuit 300 in a first direction DR1 and are spaced apart from each other in a second direction DR2. Light-emission control lines EML1 to EMLn extend from the light-emission driver circuit 400 in a direction opposite to the first direction DR1 and are spaced apart from each other in the second direction DR2. The data lines DL1 to DLm extend from the demultiplexer 500 in the second direction DR2 and are spaced apart from each other in the first direction DR1.

Each of the pixel circuits PC11 to PCnm may be connected to a corresponding scan line among the scan lines GL1 to GLn (n is a positive integer), and may be connected to a corresponding data line among the data lines DL1 to DLm (m is a positive integer), and may be connected to a corresponding light-emission control line among the light-emission control lines EML1 to EMLn. FIG. 1 shows that each of the plurality of pixel circuits PC11 to PCnm is connected to one scan line. However, the present disclosure is not limited thereto. Each of the plurality of pixel circuits PC11 to PCnm may be electrically connected to two or more scan lines.

The data driver circuit 200 receives the data control signal DCS and the output image signal DS from the drive controller 100. The data driver circuit 200 converts the output image signal DS into data signals, and outputs the data signals to output lines YL0 to YLs (s is a positive integer). Each of the data signals may have a voltage level corresponding to a grayscale level of the output image signal DS. In an embodiment, the number of output lines YL0 to YLs may be smaller than the number of data lines DL1 to DLm (that is, $s<m$).

The data driver circuit 200 may be implemented as an integrated circuit (IC) and may be directly mounted on a predetermined area of the display panel DP. Alternatively, the data driver circuit 200 may be mounted on a separate printed circuit board in a chip on film (COF) scheme and then may be electrically connected to the display panel DP. In another embodiment, the data driver circuit 200 may be directly formed on the display panel DP in the same process as a process forming each of the pixel circuits PC11 to PCnm.

The scan driver circuit 300 receives the scan control signal SCS from the drive controller 100. The scan driver circuit 300 may sequentially output the scan signals to the scan lines GL1 to GLn in response to the scan control signal SCS. In an embodiment, the scan driver circuit 300 may be formed in the same process as a process forming each of the pixel circuits PC11 to PCnm.

The light-emission driver circuit 400 receives a light-emission drive signal ECS from the drive controller 100. The light-emission driver circuit 400 may output the light-emission control signals to the light-emission control lines EML1 to EMLn in response to the light-emission drive signal ECS. In an embodiment, the light-emission driver circuit 400 may be formed in the same process as a process forming each of the pixel circuits PC11 to PCnm. FIG. 1 shows the light-emission driver circuit 400 as a separate constituent of the display device DD. However, the present disclosure is not limited thereto. In an embodiment, the light-emission driver circuit 400 may be included in the scan driver circuit 300.

The drive controller 100, the data driver circuit 200, the scan driver circuit 300, and the light-emission driver circuit 400 may be a driver circuit to provide the data signal corresponding to the input image signal RGB to the pixel circuits PC11 to PCnm.

The demultiplexer 500 may electrically connect the plurality of output lines YL0 to YLs to the data lines DL1 to DLm in response to the switching signal SW provided from the drive controller 100. A specific circuit configuration and operation of the demultiplexer 500 will be described in detail later.

FIG. 1 shows that the demultiplexer 500 is disposed in the display panel DP. However, the present disclosure is not limited thereto. In an embodiment, the demultiplexer 500 may be included in the data driver circuit 200. In an embodiment, the demultiplexer 500 may be a separate driver circuit or be arranged on a circuit board which is independent from the display panel DP and the data driver circuit 200.

Figure 2:
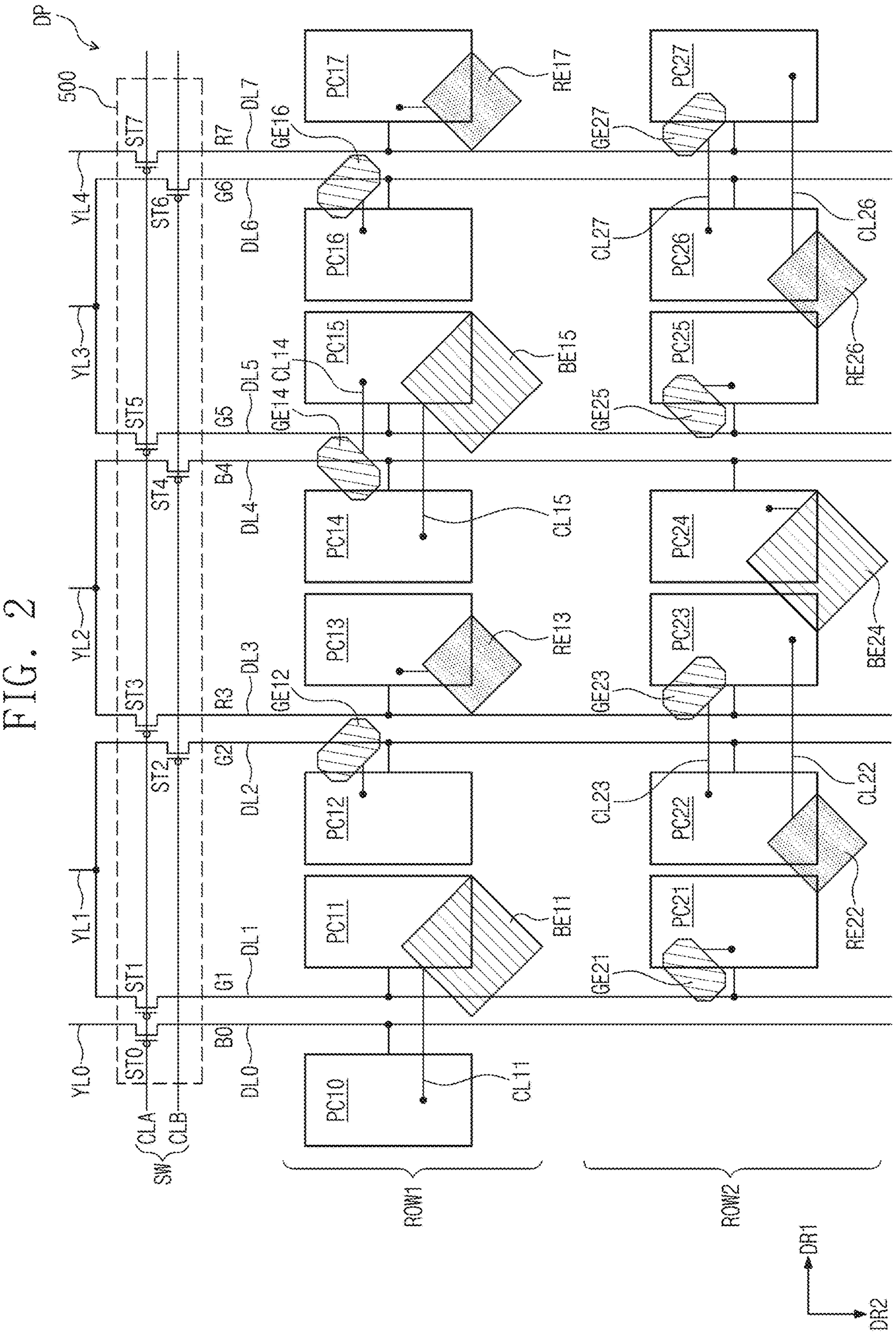
FIG. 2 is a diagram showing pixel circuits and light-emitting elements arranged on a display panel by way of example.

FIG. 2 is a diagram showing the pixel circuits and the light-emitting elements disposed on the display panel DP by way of example.

Referring to FIG. 2, the display panel DP includes the demultiplexer 500, data lines DL0 to DL7, the first-row pixel circuits PC10 to PC17, the second-row pixel circuits PC21 to PC27, first light-emitting elements BE11, BE15, and BE24, second light-emitting elements GE12, GE14, GE16, GE21, GE23, GE25, and GE27 and third light-emitting elements RE13, RE17, RE22, and RE26. Sizes and arrangements of the first-row pixel circuits PC10 to PC17, the second-row pixel circuits PC21 to PC27, the first light-emitting elements BE11, BE15, and BE24, the second light-emitting elements GE12, GE14, GE16, GE21, GE23, GE25, and GE27 and the third light-emitting elements RE13, RE17, RE22, and RE26 as shown in FIG. 2 are only examples to help understand the description. The present disclosure is not limited thereto.

In an embodiment, the first-row pixel circuits PC10 and PC11 may be referred to as the first and second pixel circuits.

The second-row pixel circuits PC21 and PC22 may be referred to as the third and fourth pixel circuits. In an embodiment, the first light-emitting element BE11, the second light-emitting element GE12, the second light-emitting element GE21 and the third light-emitting element RE22 may be referred to as a first light-emitting area, a second light-emitting area, a third light-emitting area, and a fourth light-emitting area, respectively.

The demultiplexer 500 includes first switching transistors ST0, ST1, ST3, ST5, and ST7 and second switching transistors ST2, ST4, and ST6.

The first switching transistor ST0 is disposed between and connected to the output line YL0 and the data line DL0. The first switching transistor ST1 is disposed between and connected to the output line YL1 and the data line DL1. The first switching transistor ST3 is disposed between and connected to the output line YL2 and the data line DL3. The first switching transistor ST5 is disposed between and connected to the output line YL3 and the data line DL5. The first switching transistor ST7 is disposed between and connected to the output line YL4 and the data line DL7. In an embodiment, the demultiplexer 500 may not include the first switching transistors ST0 and ST7. In this case, the output lines YL0 and YL4 may be directly connected to the data lines DL0 and DL7, respectively.

The second switching transistor ST2 is disposed between and connected to the output line YL1 and the data line DL2. The second switching transistor ST4 is disposed between and connected to the output line YL2 and the data line DL4. The second switching transistor ST6 is disposed between and connected to the output line YL3 and the data line DL6.

The first switching transistors ST0, ST1, ST3, ST5, and ST7 are turned on in response to a first switching signal CLA, and the second switching transistors ST2, ST4, and ST6 are turned on in response to a second switching signal CLB. The switching signal SW provided from the drive controller 100 as shown in FIG. 1 may include the first switching signal CLA and the second switching signal CLB.

The first-row pixel circuits PC10 to PC17 may be sequentially arranged in a first row ROW1 in the first direction DR1. The second-row pixel circuits PC21 to PC27 may be sequentially arranged in a second row ROW2 in the first direction DR1.

The data lines DL0 to DL7 may be disposed adjacent to each other on two data lines basis. That is, the data lines DL0 and DL1 are disposed adjacent to each other and between the first-row pixel circuits PC10 and PC11. The data lines DL2 and DL3 are disposed adjacent to each other and between the first-row pixel circuits PC12 and PC13. The data lines DL4 and DL5 are disposed adjacent to each other and between the first-row pixel circuits PC14 and PC15. The data lines DL6 and DL7 are disposed adjacent to each other and between the first-row pixel circuits PC16 and PC17.

The first-row pixel circuits PC10 to PC17 and the second-row pixel circuits PC21 to PC27 are respectively connected to corresponding data lines among the data lines DL1 to DL7.

In an embodiment, some of the first-row pixel circuits PC10 to PC17 and the second-row pixel circuits PC21 to PC27 may be respectively connected to corresponding right data lines of the data lines DL1 to DL7, while others thereof may be respectively connected to corresponding left data lines of the data lines DL1 to DL7.

In an embodiment, the first-row pixel circuits PC10, PC12, PC14, and PC16 and the second-row pixel circuits PC22, PC24, and PC26 are connected to the data lines DL0, DL2, DL4, and DL6 adjacent thereto in a right direction, respectively. In an embodiment, the first-row pixel circuits PC11, PC13, PC15, and PC17 and the second-row pixel circuits PC21, PC23, PC25, and PC27 are connected to the data lines DL1, DL3, DL5, and DL7 adjacent thereto in a left direction, respectively.

The first light-emitting elements BE11 and BE15, the second light-emitting elements GE12, GE14, and GE16, and the third light-emitting elements RE13 and RE17 are arranged in the first row ROW1.

In the first row ROW1, the first light-emitting element BE11, the second light-emitting element GE12, the third light-emitting element RE13, the second light-emitting element GE14, the first light-emitting element BE15, the second light-emitting element GE16, and the third light-emitting element RE17 may be sequentially arranged in the first direction DR1.

In the second row ROW2, the second light-emitting element GE21, the third light-emitting element RE22, the second light-emitting element GE23, the first light-emitting element BE24, the second light-emitting element GE25, the third light-emitting element RE26 and the second light-emitting element GE27 may be sequentially arranged in the first direction DR1.

In an embodiment, each of the first light-emitting elements BE11, BE15, and BE24 may emit first color light. Each of the second light-emitting elements GE12, GE14, GE16, GE21, GE23, GE25, and GE27 may emit second color light. Each of the third light-emitting elements RE13, RE17, RE22, and RE26 may emit third color light. In an embodiment, the first to third color light may be different color light.

In an embodiment, the first to third color light may be blue light, green light, and red light, respectively. However, the present disclosure is not limited thereto. In another embodiment, each of the first to third color light may be various color light such as blue light, green light, red light, white light, cyan light, magenta light, and yellow light.

The first light-emitting element BE11 of the first row ROW1 is electrically connected to the first-row pixel circuit PC10 via a connection wiring CL11. The first light-emitting element BE15 of the first row ROW1 is electrically connected to the first-row pixel circuit PC14 via a connection wiring CL15.

The second light-emitting elements GE12, GE14, and GE16 of the first row ROW1 are electrically connected to the first-row pixel circuits PC12, PC14, and PC16, respectively. The third light-emitting elements RE13 and RE17 of the first row ROW1 are electrically connected to the first-row pixel circuits PC13 and PC17, respectively.

The second light-emitting elements GE21 and GE25 of the second row ROW2 are electrically connected to the second-row pixel circuits PC21 and PC25, respectively. The second light-emitting element GE23 of the second row ROW2 is electrically connected to the second-row pixel circuit PC22 via a connection wiring CL23. The second light-emitting element GE27 of the second row ROW2 is electrically connected to the second-row pixel circuit PC26 via a connection wiring CL27.

The third light-emitting element RE22 of the second row ROW2 is electrically connected to the second-row pixel circuit PC23 via a connection wiring CL22. The first light-emitting element BE24 of the second row ROW2 is electrically connected to the second-row pixel circuit PC24. The third light-emitting element RE26 of the second row ROW2 is electrically connected to the second-row pixel circuit PC27 via a connection wiring CL26.

The first-row pixel circuit PC10 connected to the data line DL0 is connected to the first light-emitting element BE11.

The second-row pixel circuit PC21 connected to the data line DL1 is connected to the second light-emitting element GE21.

The first-row pixel circuit PC12 and the second-row pixel circuit PC22 connected to the data line DL2 are respectively connected to the second light-emitting elements GE12 and GE23.

The first-row pixel circuit PC13 and the second-row pixel circuit PC23 connected to the data line DL3 are respectively connected to the third light-emitting elements RE13 and RE22.

The first-row pixel circuit PC14 and the second-row pixel circuit PC24 connected to the data line DL4 are respectively connected to the first light-emitting elements BE15 and BE24.

The first-row pixel circuit PC15 and the second-row pixel circuit PC25 connected to the data line DL5 are connected to the second light-emitting elements GE14 and GE25, respectively.

The first-row pixel circuit PC16 and the second-row pixel circuit PC26 connected to the data line DL6 are respectively connected to the second light-emitting elements GE16 and GE27.

The first-row pixel circuit PC17 and the second-row pixel circuit PC27 connected to the data line DL7 are respectively connected to the third light-emitting elements RE17 and RE26.

As shown in FIG. 2, the light-emitting element(s) emitting the same color light are connected to each of the data lines DL0 to DL7. Therefore, the data signals of a single color may be provided to each of the data lines DL0 to DL7.

Figure 3:
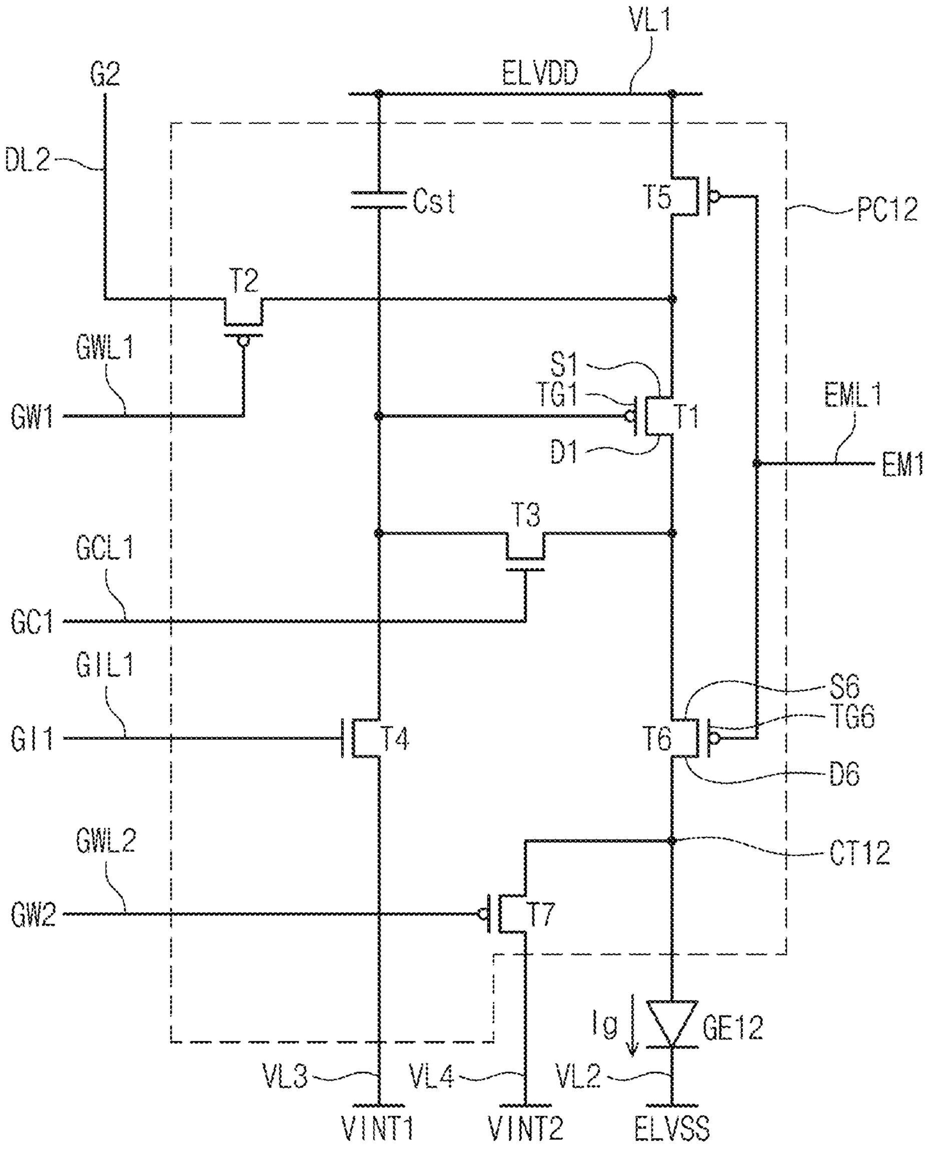
FIG. 3 is a circuit diagram of a first-row pixel circuit and a second light-emitting element according to an embodiment of the present disclosure.

FIG. 3 is a circuit diagram of the first-row pixel circuit PC12 and the second light-emitting element GE12 according to an embodiment of the present disclosure.

FIG. 3 shows the first-row pixel circuit PC12 and the second light-emitting element GE12 by way of example. In an embodiment, the second light-emitting element GE12 may be a light-emitting diode. The second light-emitting element GE12 may emit the second color light (e.g., green light).

In an embodiment, the first-row pixel circuit PC12 may include at least one transistor and at least one capacitor. The first-row pixel circuit PC12 as shown in FIG. 3 includes first to seventh transistors T1, T2, T3, T4, T5, T6, and T7 and a capacitor Cst. A configuration of the pixel circuit PC12 as shown in FIG. 3 is only an example, and the configuration of the first-row pixel circuit PC12 may be altered as needed.

In this embodiment, each of the third and fourth transistors T3 and T4 among the first to seventh transistors T1 to T7 may be an N-type transistor using an oxide semiconductor as a semiconductor layer. Each of the first, second, fifth, sixth, and seventh transistors T1, T2, T5, T6, and T7 may be a P-type transistor having a low-temperature polycrystalline silicon (LTPS) semiconductor layer. However, the present disclosure is not limited thereto. In an embodiment, all of the first to seventh transistors T1 to T7 may be P-type transistors or N-type transistors. In another embodiment, at least one of the first to seventh transistors T1 to T7 may be an N-type transistor and the others thereof may be P-type transistors.

In an embodiment, the first-row pixel circuit PC12 may be electrically connected to one data line DL2, four scan lines GIL1, GCL1, GWL1, and GWL2 and one light-emission control line EML1. Each of the scan lines GL1 to GLn as shown in FIG. 1 may include a plurality of scan lines. In an embodiment, the scan line GL1 as shown in FIG. 1 may include four scan lines GIL1, GCL1, GWL1, and GWL2.

The scan lines GIL1, GCL1, GWL1, and GWL2 may transmit scan signals GI1, GC1, GW1, and GW2, respectively. The light-emission control line EML1 may transmit a light-emission control signal EM1. The data line DL2 carries a data signal G2. The data signal G2 may have a voltage level corresponding to the image signal RGB input to the display device DD (see FIG. 1). First to fourth drive voltage lines VL1, VL2, VL3, and VL4 may transmit a first drive voltage ELVDD, a second drive voltage ELVSS, a first initialization voltage VINT1 and a second initialization voltage VINT2, respectively.

The first transistor T1 includes a first electrode S1 connected to the first drive voltage line VL1 via the fifth transistor T5, a second electrode D1 electrically connected to an anode of the second light-emitting element GE12 via the sixth transistor T6, and a gate electrode TG1 connected to one end of the capacitor Cst.

The second transistor T2 includes a first electrode connected to the data line DL2, a second electrode connected to the first electrode S1 of the first transistor T1, and a gate electrode connected to the scan line GWL1. The second transistor T2 may be turned on in response to the scan signal GW1 received via the scan line GWL1 to transmit the data signal G2 transmitted from the data line DL2 to the first electrode S1 of the first transistor T1. The data signal G2 transmitted from the data line DL2 may correspond to the second color.

The third transistor T3 includes a first electrode connected to the gate electrode TG1 of the first transistor T1, a second electrode connected to the second electrode D1 of the first transistor T1, and a gate electrode connected to the scan line GCL1. The third transistor T3 may be turned on in response to the scan signal GC1 received through the scan line GCL1 to connect the gate electrode TG1 of the first transistor T1 to the second electrode of the first transistor T1 such that the first transistor T1 may be connected in a diode manner.

The fourth transistor T4 includes a first electrode connected to the gate electrode TG1 of the first transistor T1, a second electrode connected to the third drive voltage line VL3 to which the first initialization voltage VINT1 is transmitted, and a gate electrode connected to the scan line GIL1. The fourth transistor T4 may be turned on in response to the scan signal GI01 received via the scan line GIL1 to transfer the first initialization voltage VINT1 to the gate electrode TG1 of the first transistor T1 to initialize a voltage of the gate electrode TG1 of the first transistor T1.

The fifth transistor T5 includes a first electrode connected to the first drive voltage line VL1, a second electrode connected to the first electrode S1 of the first transistor T1, and a gate electrode connected to the light-emission control line EML1.

The sixth transistor T6 includes a first electrode S6 connected to the second electrode D1 of the first transistor T1, a second electrode D6 connected to an anode of the second light-emitting element GE12, and a gate electrode TG6 connected to the light-emission control line EML1. The second electrode D2 of the sixth transistor T6 and the anode of the second light-emitting element GE12 may be connected to each other via a connection node CT12.

The fifth transistor T5 and the sixth transistor T6 may be simultaneously turned on in response to the light-emission control signal EM1 transmitted via the light-emission control line EML1. As the fifth transistor T5 and the sixth transistor T6 are turned on, a current path from the first drive voltage line VL1 to the second light-emitting element GE21 via the fifth transistor T5, the first transistor T1, and the sixth transistor T6 may be formed. In this regard, current flowing through the first transistor T1 may correspond to charges stored in the capacitor Cst. Therefore, current Ig corresponding to the data signal G2 may be transferred to the second light-emitting element GE12. In other words, the data signal G2 may be converted into the current Ig via the first-row pixel circuit PC12 and then, the current Ig may be provided to the second light-emitting element GE12.

The seventh transistor T7 includes a first electrode connected to the second electrode of the sixth transistor T6, a second electrode connected to the fourth drive voltage line VL4, and a gate electrode connected to the scan line GWL2. The seventh transistor T7 may be turned on in response to the scan signal GW2 received via the scan line GWL2 to initialize the anode of the second light-emitting element GE12 based on the second initialization voltage VINT2 supplied from the fourth drive voltage line VL4.

As described above, one end of the capacitor Cst is connected to the gate electrode TG1 of the first transistor T1, and the other end thereof is connected to the first drive voltage line VL1. A cathode of the second light-emitting element GE12 may be connected to the second drive voltage line VL2 transmitting the second drive voltage ELVSS.

Like the first-row pixel circuit PC12 as shown in FIG. 3, each of the first-row pixel circuits PC13, PC16, and PC17 and the second-row pixel circuits PC21, PC24, and PC25 as shown in FIG. 2 may be electrically connected to a light-emitting element disposed adjacent thereto (or partially overlapping therewith).

Figure 4:
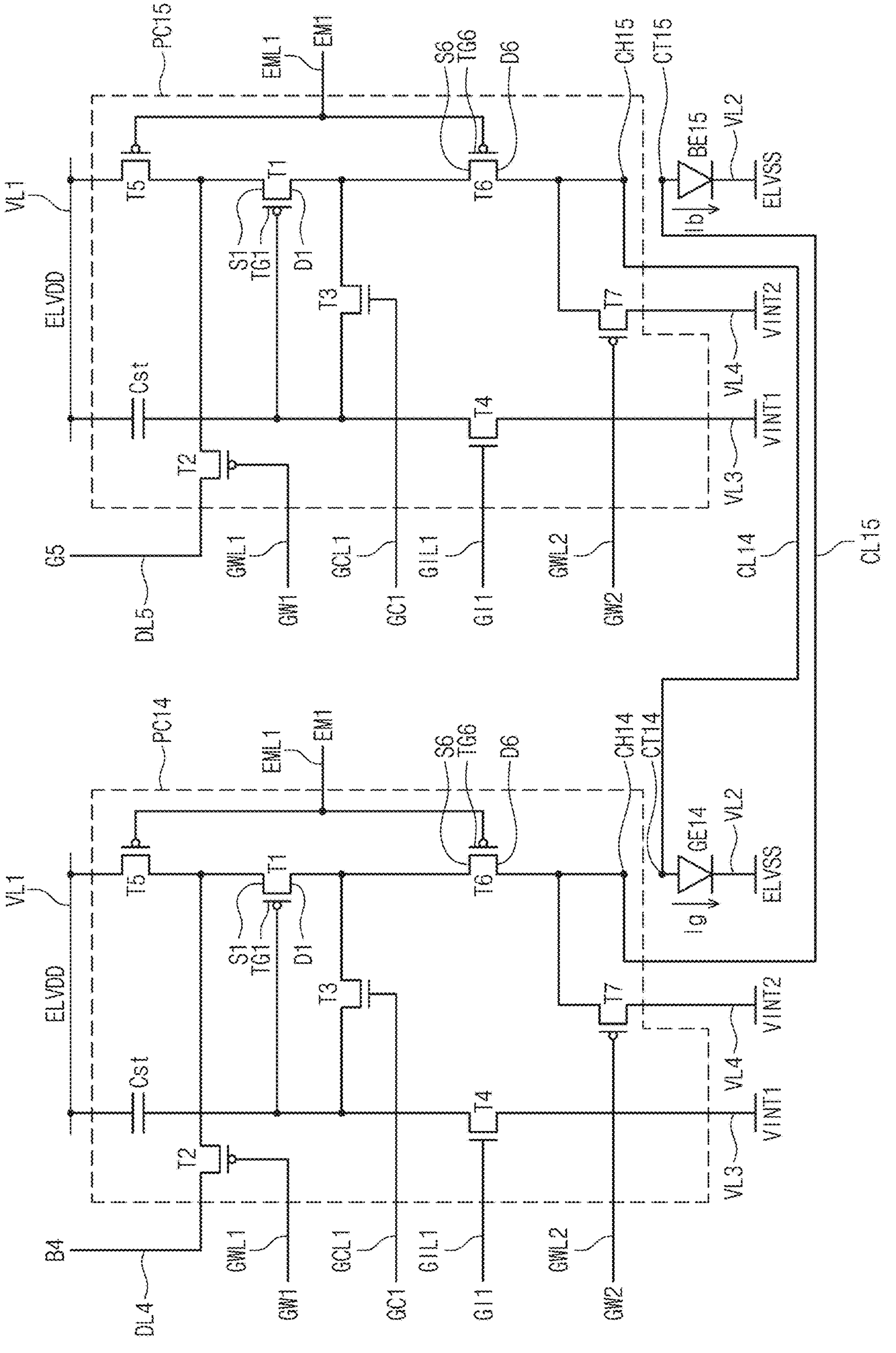
FIG. 4 is a circuit diagram of a first-row pixel circuit, a second light-emitting element, a pixel circuit, and a first light-emitting element according to an embodiment of the present disclosure.

FIG. 4 shows a circuit diagram of the first-row pixel circuit PC14, the second light-emitting element GE14, the first-row pixel circuit PC15 and the first light-emitting element BE15 according to an embodiment of the present disclosure.

Each of the first-row pixel circuit PC14 and the first-row pixel circuit PC15 as shown in FIG. 4 may include a circuit configuration similar to that of the pixel circuit PC12 as shown in FIG. 3. A component of each of the first-row pixel circuit PC14 and the first-row pixel circuit PC15 as shown in FIG. 4 identical with that of the first-row pixel circuit PC12 in FIG. 3 may have the same reference numeral. Redundant description thereof is omitted.

Referring to FIG. 2 and FIG. 4, the second light-emitting element GE14 disposed adjacent to (or partially overlapping) the first-row pixel circuit PC14 may be a light-emitting element that emits the second color light (for example, green light). In an embodiment, the first-row pixel circuit PC14 and the second light-emitting element GE14 are electrically insulated from each other.

The first light-emitting element BE15 disposed adjacent to (or partially overlapping) the first-row pixel circuit PC15 may be a light-emitting element emitting the first color light (e.g., blue light). In an embodiment, the first-row pixel circuit PC15 and the first light-emitting element BE15 are electrically insulated from each other.

In an embodiment, the first-row pixel circuit PC14 is electrically connected to the first light-emitting element BE15 via a connection portion CH14, the connection wiring CL15 and a connection node CT15. Therefore, a data signal B4 transmitted via the data line DL4 may be converted into current Ib via the first-row pixel circuit PC14 and the current Ib may be provided to the first light-emitting element BE15.

In an embodiment, the first-row pixel circuit PC15 is electrically connected to the second light-emitting element GE14 via a connection portion CH15, a connection wiring CL14 and a connection node CT14. Therefore, a data signal G5 transmitted via the data line DL5 may be converted into current Ig via the first-row pixel circuit PC15 and the current Ig may be provided to the second light-emitting element GE14.

Like the first-row pixel circuit PC14 as shown in FIG. 4, each of the first-row pixel circuit PC10 and the second-row pixel circuits PC22, PC23, PC26, and PC27 as shown in FIG. 2 may be electrically connected to a light-emitting element spaced apart therefrom (or non-overlapping therewith).

Figure 5:
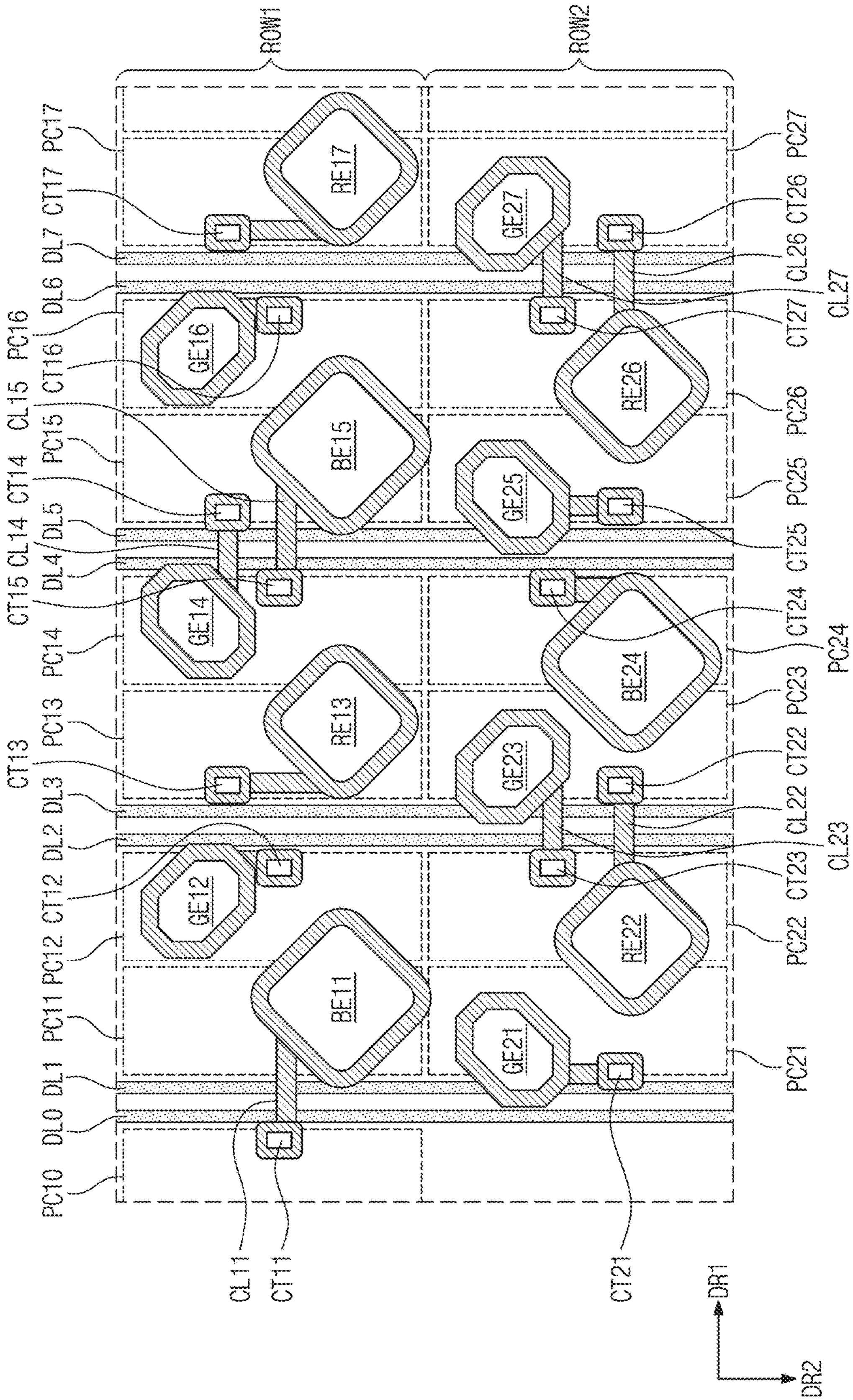
FIG. 5 is a plan view of a display panel according to an embodiment of the present disclosure.

FIG. 5 is a plan view of the display panel DP according to an embodiment of the present disclosure.

The plan view as shown in FIG. 5 is only one example, and the present disclosure is not limited thereto.

Referring to FIG. 5, the first light-emitting element BE11, the second light-emitting element GE12, the third light-emitting element RE13, the second light-emitting element GE14, the first light-emitting element BE15, the second light-emitting element GE16, and the third light-emitting element RE17 may be disposed in the first row ROW1. The first-row pixel circuits PC10 to PC17 may be disposed in the first row ROW1. In FIG. 5, an area where each of the first-row pixel circuits PC10 to PC17 is disposed is shown with a dotted line. However, the present disclosure is not limited thereto. A shape and/or a size of the area where each of the first-row pixel circuits PC10 to PC17 is disposed may be variously changed.

The first light-emitting element BE11 is electrically connected to the first-row pixel circuit PC10 via a connection wiring CL11 and a connection node CT11. The second light-emitting element GE12 is electrically connected to the first-row pixel circuit PC12 via the connection node CT12. The third light-emitting element RE13 is electrically connected to the first-row pixel circuit PC13 via a connection node CT13. The second light-emitting element GE14 is electrically connected to the first-row pixel circuit PC15 via the connection node CT14, the connection wiring CL14 and the connection portion CH15 as disclosed in FIG. 4. The first light-emitting element BE15 is electrically connected to the first-row pixel circuit PC14 via the connection node CT15, the connection wiring CL15 and the connection portion CH14 as disclosed in FIG. 4. The second light-emitting element GE16 is electrically connected to the first-row pixel circuit PC16 via a connection node CT16. The third light-emitting element RE17 is electrically connected to the first-row pixel circuit PC17 via a connection node CT17.

A portion of each of the first light-emitting element BE11, the second light-emitting element GE12, the third light-emitting element RE13, the second light-emitting element GE14, the first light-emitting element BE15, the second light-emitting element GE16, and the third light-emitting element RE17 overlaps corresponding one of the first-row pixel circuits PC11 to PC17 in a plan view.

FIG. 5 shows that the first light-emitting elements BE11 and BE15 do not overlap with the first-row pixel circuits PC10 and PC14 to which the first light-emitting elements BE11 and BE15 are connected, respectively. However, the present disclosure is not limited thereto. In an embodiment, at least a portion of the first light-emitting element BE11 may overlap the first-row pixel circuit PC10. In an embodiment, at least a portion of the first light-emitting element BE11 may not overlap the first-row pixel circuit PC10. In an embodiment, at least a portion of the first light-emitting element BE15 may overlap the first-row pixel circuit PC14. In an embodiment, at least a portion of the first light-emitting element BE15 may not overlap the first-row pixel circuit PC14.

Each of the connection wirings CL14 and CL15 may intersect the data lines DL4 and DL5 to overlap the data lines DL4 and DL5 in a plan view.

Each of the pixel circuits PC12, PC13, PC16, and PC17 in the first row may be electrically connected to each of the light-emitting elements GE12, RE13, GE16, and RE17 disposed adjacent thereto (or partially overlapping therewith).

Each of the pixel circuits PC10, PC14, and PC15 may be electrically connected to each of the light-emitting elements BE11, GE14, and BE15 that are spaced apart therefrom (or non-overlapping therewith) with at least one data line disposed therebetween.

The second light-emitting element GE21, the third light-emitting element RE22, the second light-emitting element GE23, the first light-emitting element BE24, the second light-emitting element GE25, the third light-emitting element RE26, and the second light-emitting element GE27 may be disposed in the second row ROW2. The second-row pixel circuits PC21 to PC27 may be disposed in the second row ROW2. In FIG. 5, an area where each of the second-row pixel circuits PC21 to PC27 is disposed is shown with a dotted line. However, the present disclosure is not limited thereto. A shape and/or a size of the area where each of the second-row pixel circuits PC21 to PC27 is disposed may be variously changed.

The second light-emitting element GE21 is electrically connected to the second-row pixel circuit PC21 via a connection node CT21. The third light-emitting element RE22 is electrically connected to the second-row pixel circuit PC23 via the connection wiring CL22 and a connection node CT22. The second light-emitting element GE23 is electrically connected to the second-row pixel circuit PC22 via the connection wiring CL23 and a connection node CT23. The first light-emitting element BE24 is electrically connected to the second-row pixel circuit PC24 via a connection node CT24. The second light-emitting element GE25 is electrically connected to the second-row pixel circuit PC25 via a connection node CT25. The third light-emitting element RE26 is electrically connected to the second-row pixel circuit PC27 via the connection wiring CL26 and a connection node CT26. The second light-emitting element GE27 is electrically connected to the second-row pixel circuit PC26 via the connection wiring CL27 and a connection node CT27.

A portion of each of the second light-emitting element GE21, the third light-emitting element RE22, the second light-emitting element GE23, the first light-emitting element BE24, the second light-emitting element GE25, the third light-emitting element RE26, and the second light-emitting element GE27 overlaps corresponding one of the second-row pixel circuits PC21 to PC27 in a plan view.

Each of the connection wirings CL22 and CL23 may intersect the data lines DL2 and DL3 to overlap the data lines DL2 and DL3 in a plan view. Each of the connection wirings CL26 and CL27 may intersect the data lines DL6 and DL7 to overlap the data lines DL6 and DL7 in the plan view.

Each of the pixel circuits PC21, PC24, and PC25 may be electrically connected to each of the light-emitting elements GE21, BE24, and GE25 disposed adjacent thereto (or partially overlapping therewith).

Each of the pixel circuits PC22, PC23, PC26, and PC27 may be electrically connected to each of the light-emitting elements GE23, RE22, GE27, and RE26 spaced apart therefrom (or non-overlapping therewith) with at least one data line disposed therebetween.

Figure 6:
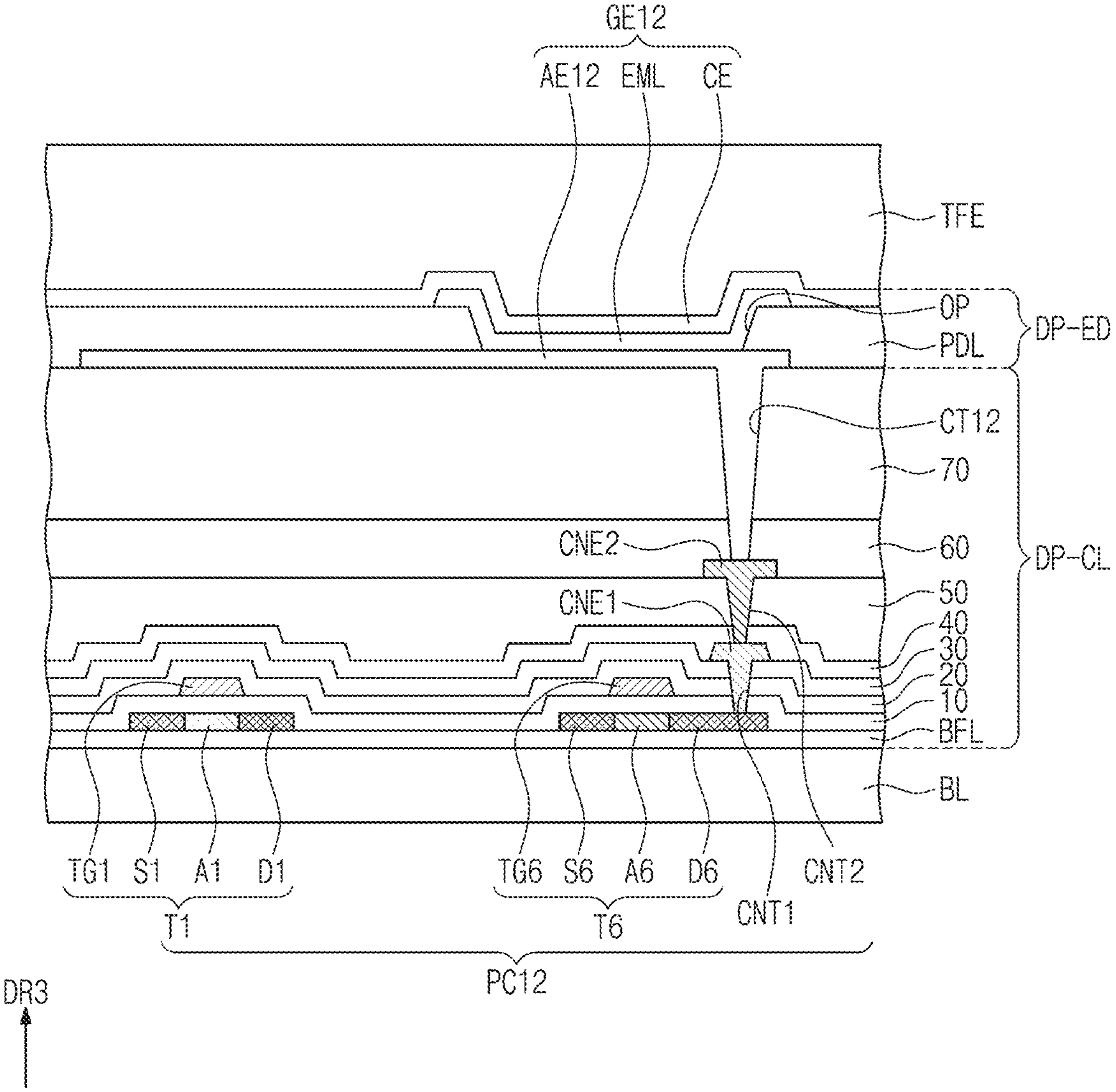
FIG. 6 is a diagram illustrating a cross-section of a portion of each of a second light-emitting element and a first-row pixel circuit of a display panel according to an embodiment of the present disclosure by way of example.

FIG. 6 shows a cross-section of a portion of each of the second light-emitting element GE12 and the first-row pixel circuit PC12 of the display panel DP according to an embodiment of the present disclosure by way of example.

Referring to FIG. 6, the display panel DP includes a base layer BL, a circuit element layer DP-CL, a display element layer DP-ED, and a thin-film encapsulation layer TFE. The display panel DP may further include functional layers (not shown) such as a refractive index control layer. The circuit element layer DP-CL includes at least a plurality of insulating layers and a circuit element. Hereinafter, the insulating layers may include an organic layer and/or an inorganic layer.

An insulating layer, a semiconductor layer, and a conductive layer are formed using a process such as coating or deposition. Thereafter, the insulating layer, the semiconductor layer, and the conductive layer may be selectively patterned using photolithography and etching processes. In this process, a semiconductor pattern, a conductive pattern, a signal line, etc. are formed. The patterns disposed in the same layer are formed in the same process.

The base layer BL may include a synthetic resin film. The synthetic resin layer may include a thermosetting resin. In particular, the synthetic resin layer may be a polyimide-based resin layer, and the material thereof is not particularly limited. The synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin. In addition, the base layer may include a glass substrate, a metal substrate, or an organic/inorganic composite substrate.

At least one inorganic layer is formed on an upper surface of the base layer BL. The inorganic layer may include at least one of aluminum oxide, titanium oxide, silicon oxide silicon oxynitride, zirconium oxide, and hafnium oxide. The inorganic layer may be formed in a stack of multiple layers. At least one of the multiple inorganic layers may constitute a buffer layer BFL.

The buffer layer BFL improves bonding strength between the base layer BL and the semiconductor pattern and/or the conductive pattern. The buffer layer BFL may include a silicon oxide layer and a silicon nitride layer. The silicon oxide layers and the silicon nitride layers may be alternately stacked on top of each other.

The semiconductor pattern is disposed on the buffer layer BFL. The semiconductor pattern may be directly disposed on the buffer layer BFL. The semiconductor pattern may include a silicon semiconductor. The semiconductor pattern may include low-temperature polycrystalline silicon (LTPS). However, the present disclosure is not limited thereto, and the semiconductor pattern may include amorphous silicon.

The semiconductor pattern has electrical properties varying depending on whether it is doped or not. The semiconductor pattern may include a doped area and a non-doped area. The doped area may be doped with an N-type dopant or a P-type dopant. A P-type transistor includes a doped area doped with a P-type dopant.

The doped area has higher conductivity than that of the non-doped area and acts as an electrode or a signal line. The non-doped area actually corresponds to an active area or a channel of a transistor. In other words, one portion of the semiconductor pattern may act as an active area of the transistor, another portion thereof may act as a first electrode (source electrode) or a second electrode (drain electrode) of the transistor, and still another portion thereof may act as a connection electrode or a connection signal line thereof.

As shown in FIG. 6, the first electrode S1, an active area A1, and the second electrode D1 of the first transistor T1 in the first-row pixel circuit PC12 is formed from the semiconductor pattern. The first electrode S1 and the second electrode D1 of the first transistor T1 extend in opposite directions from the active area A1. Further, the first electrode S6, an active area A6, and the second electrode D6 of the sixth transistor T6 are formed from the semiconductor pattern. The first electrode S6 and the second electrode D6 of the sixth transistor T6 extend in opposite directions from the active area A6. Although not separately shown, the first electrode S6 of the sixth transistor T6 may be connected to the second electrode D1 of the first transistor T1.

As shown in FIG. 3, the first electrode S6 of the sixth transistor T6 may be electrically connected to the second electrode D1 of the first transistor T1.

A first insulating layer 10 is disposed on the buffer layer BFL. The first insulating layer 10 commonly covers the semiconductor pattern as shown in FIG. 5. The first insulating layer 10 may be an inorganic layer and/or an organic layer, and may have a single-layer or multi-layer structure. The first insulating layer 10 may include at least one of aluminum oxide, titanium oxide, silicon oxide, silicon oxynitride, zirconium oxide, and hafnium oxide. In this embodiment, the first insulating layer 10 may be a single layer made of silicon oxide. Not only the first insulating layer 10, but also an insulating layer of the circuit element layer DP-CL as described later may be an inorganic layer and/or an organic layer, and may have a single-layer or multi-layer structure. The inorganic layer may include at least one of the above materials.

The gate electrode TG1 of the first transistor T1 is disposed on the first insulating layer 10. The gate electrode TG1 may be a portion of a metal pattern. The gate electrode TG1 of the first transistor T1 overlaps the active area A1 of the first transistor T1. In a process of doping the semiconductor pattern, the gate electrode TG1 of the first transistor T1 acts as a self-aligned mask.

A second insulating layer 20 covering the gate electrode TG1 is disposed on the first insulating layer 10. The second insulating layer 20 may commonly overlap the pixel circuits PC10 to PC27, PC21 to PC27 (see FIG. 5). The second insulating layer 20 may be an inorganic layer and/or an organic layer, and may have a single-layer or multi-layer structure. In this embodiment, the second insulating layer 20 may be a single layer made of silicon oxide.

A third insulating layer 30 is disposed on the second insulating layer 20. In this embodiment, the third insulating layer 30 may be a single layer made of silicon oxide.

A first connection electrode CNE1 may be disposed on the third insulating layer 30. The first connection electrode CNE1 may be connected to the second electrode D6 of the sixth transistor T6 via a contact-hole CNT1 formed through the first to third insulating layers 10 to 30.

A fourth insulating layer 40 covering the first connection electrode CNE1 may be disposed on the third insulating layer 30. The fourth insulating layer 40 may be a single layer made of silicon oxide. A fifth insulating layer 50 is disposed on the fourth insulating layer 40. The fifth insulating layer 50 may be an organic layer. A second connection electrode CNE2 may be disposed on the fifth insulating layer 50. The second connection electrode CNE2 may be connected to the first connection electrode CNE1 via a contact-hole CNT2 formed through the fourth insulating layer 40 and the fifth insulating layer 50.

A sixth insulating layer 60 covering the second connection electrode CNE2 is disposed on the fifth insulating layer 50. The sixth insulating layer 60 may be an organic layer. A seventh insulating layer 70 is disposed on the sixth insulating layer 60. An anode AE12 is disposed on the seventh insulating layer 70. The anode AE12 is connected to the second connection electrode CNE2 via the connection node CT12 extending through the sixth insulating layer 60 and the seventh insulating layer 70. An opening OP is defined in the pixel defining film PDL. The opening OP of the pixel defining film PDL does not cover at least a portion of the anode AE12, for example, a center portion of the anode AE12.

A light-emitting layer EML is disposed on the anode AE12. The light-emitting layer EML may be disposed to completely cover the portion of the anode AE12 not covered by the pixel defining film PDL. The light-emitting layer EML may be an isolated pattern formed corresponding to each of the pixel circuits PC10 to PC27 and PC21 to PC27 (see FIG. 5).

Although the patterned light-emitting layer EML is illustrated by way of example in this embodiment, the light-emitting layer EML may be formed commonly throughout the pixel circuits PC10 to PC27 and PC21 to PC27. In this regard, the light-emitting layer EML may emit either white light or blue light. Further, the light-emitting layer EML may have a multilayer structure. A cathode CE is disposed on the light-emitting layer EML. The cathode CE is formed commonly throughout the pixel circuits PC10 to PC27 and PC21 to PC27.

Although not shown in the figure, a hole control layer may be disposed between the anode AE12 and the light-emitting layer EML. Further, an electron control layer may be disposed between the light-emitting layer EML and the cathode CE.

The thin-film encapsulation layer TFE is disposed on the cathode CE. The thin-film encapsulation layer TFE is formed commonly throughout the pixel circuits PC10 to PC27 and PC21 to PC27. In this embodiment, the thin-film encapsulation layer TFE directly covers the cathode CE. In an embodiment of the present disclosure, a capping layer directly covering the cathode CE may be further disposed between the cathode CE and the thin-film encapsulation layer TFE.

The thin-film encapsulation layer TFE includes at least an inorganic layer or an organic layer. In an embodiment of the present disclosure, the thin-film encapsulation layer TFE may include two inorganic layers and an organic layer disposed therebetween. In an embodiment of the present disclosure, the thin-film encapsulation layer TFE may include a plurality of inorganic layers and a plurality of organic layers that are alternately stacked with each other.

The encapsulation inorganic layer protects the second light-emitting element GE12 from moisture/oxygen, and the encapsulation organic layer protects the second light-emitting element GE12 from foreign materials such as dust particles. The encapsulation inorganic layer may include a silicon nitride layer, a silicon oxy nitride layer, a silicon oxide layer, a titanium oxide layer, or an aluminum oxide layer. However, the present disclosure is not particularly limited thereto. The encapsulation organic layer may include an acrylate-based organic layer. However, the present disclosure is not particularly limited.

Figure 7:
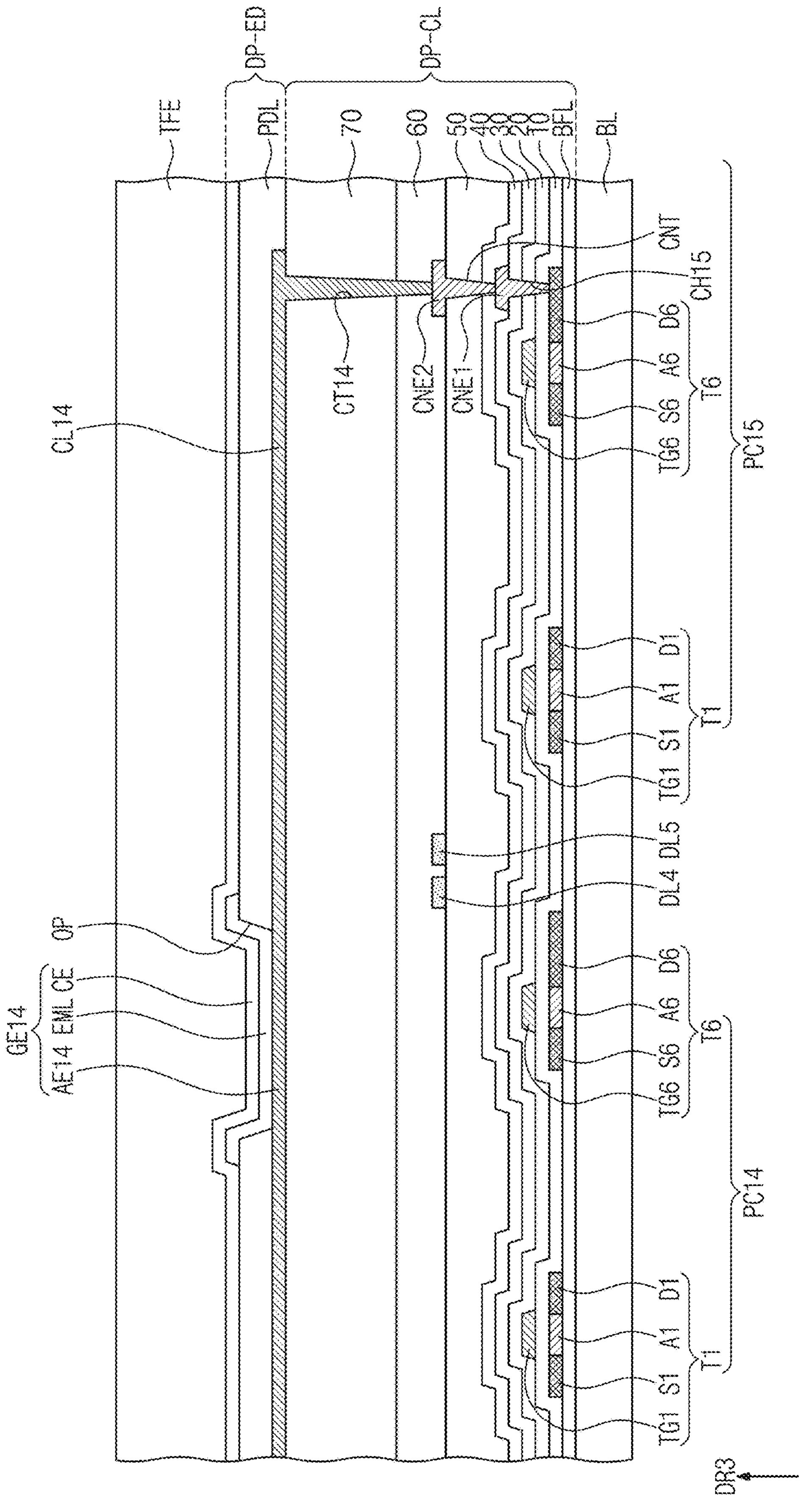
FIG. 7 is a diagram showing a cross-section of a portion of each of a second light-emitting element, a first-row pixel circuit, and another first-row pixel circuit of a display panel according to an embodiment of the present disclosure by way of example.

FIG. 7 is a diagram showing a cross section of a portion of each of the second light-emitting element GE14, the first-row pixel circuit PC14, and the first-row pixel circuit PC15 of the display panel DP according to an embodiment of the present disclosure by way of example.

The second light-emitting element GE14 as shown in FIG. 7 may include a configuration similar to that of the second light-emitting element GE12 as shown in FIG. 6. Therefore, duplicate descriptions thereof are omitted.

Each of the first transistor T1 and the sixth transistor T6 of the first-row pixel circuit PC14 as shown in FIG. 7 may have a configuration similar to that of each of the first transistor T1 and the sixth transistor T6 of the first-row pixel circuit PC12 as shown in FIG. 6. Therefore, duplicate descriptions thereof are omitted.

Further, each of the first transistor T1 and the sixth transistor T6 of the first-row pixel circuit PC15 as shown in FIG. 7 may have a configuration similar to that of each of the first transistor T1 and the sixth transistor T6 of the first-row pixel circuit PC12 as shown in FIG. 6. Therefore, duplicate descriptions thereof are omitted.

Referring to FIG. 7, the second light-emitting element GE14 may be formed to overlap the first-row pixel circuit PC14. An anode AE14 of the second light-emitting element GE14 extends toward the first-row pixel circuit PC15. A portion of the anode AE14 of the second light-emitting element GE14 may act as the connection wiring CL14. The connection wiring CL14 is connected to the second connection electrode CNE2 via the connection node CT14 (or a contact-hole) extending through the seventh insulating layer 70 and the sixth insulating layer 60. The second connection electrode CNE2 may be connected to the first connection electrode CNE1 via a contact-hole CNT formed through the fourth insulating layer 40 and the fifth insulating layer 50. The first connection electrode CNE1 may be connected to the second electrode D6 of the sixth transistor T6 of the first-row pixel circuit PC15 via the connection portion CH15 (or a contact-hole) extending through the first to third insulating layers 10 to 30.

That is, the anode AE14 of the second light-emitting element may be electrically connected to the second electrode D6 of the sixth transistor T6 of the first-row pixel circuit PC15 via the connection wiring CL14, the connection node CT14, the second connection electrode CNE2 and the first connection electrode CNE1.

In an embodiment, the data lines DL4 and DL5 may be disposed on the fifth insulating layer 50. The data lines DL4 and DL5 may overlap the connection wiring CL14 extending from the anode AE14 of the second light-emitting element GE14 to the connection wiring CL14.

Figure 8:
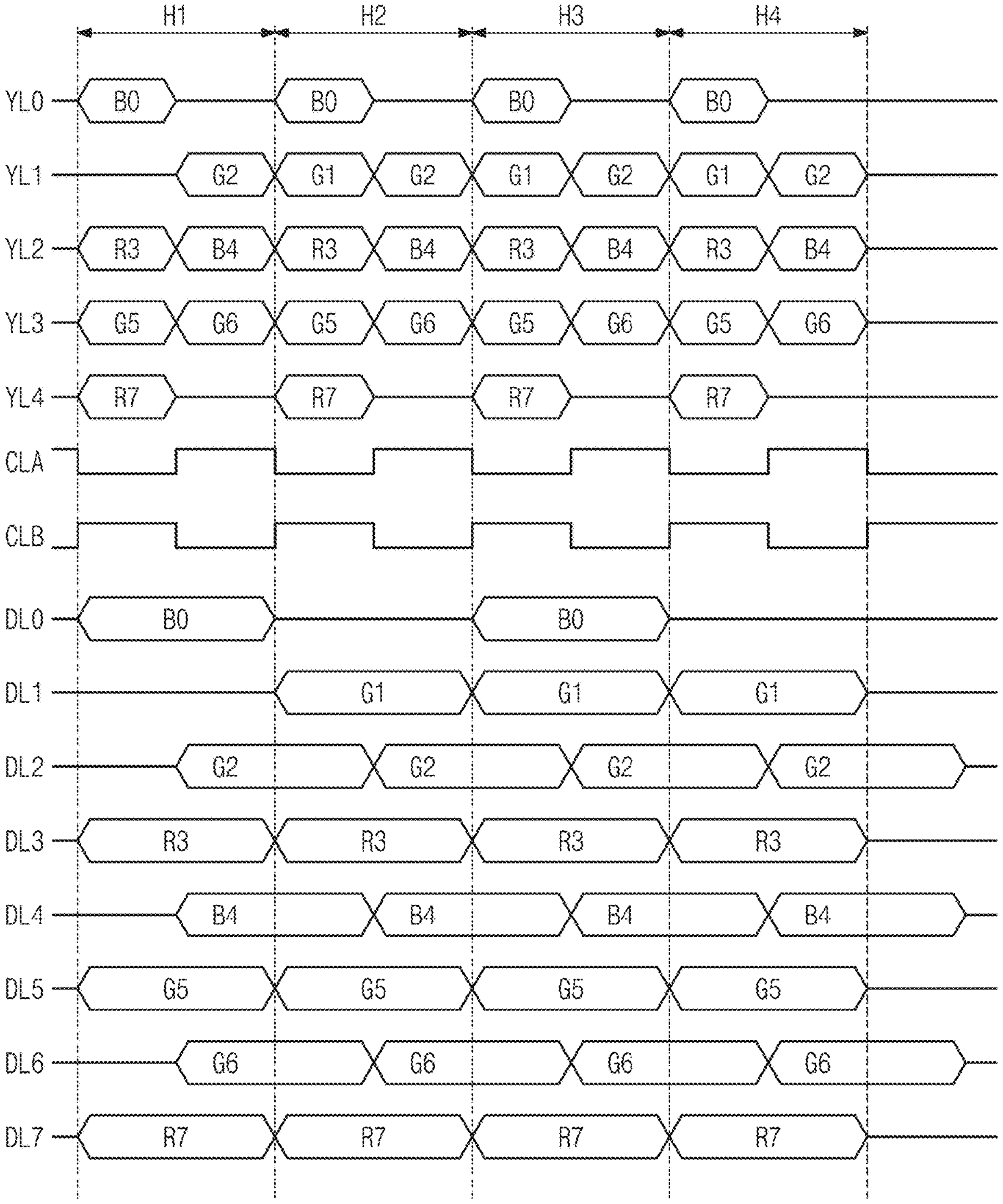
FIG. 8 is a timing diagram for illustrating an operation of a display device.

FIG. 8 is a timing diagram for illustrating an operation of a display device.

Referring to FIG. 2 and FIG. 8, the data driver circuit 200 sequentially outputs data signals B0, B0, B0 and B0 to the demultiplexer 500 via the output line YL0.

The data driver circuit 200 sequentially outputs the data signals G2, G1, G2, G1, G2, G1 and G2 to the demultiplexer 500 via the output line YL1.

The data driver circuit 200 sequentially outputs data signals R3, B4, R3, B4, R3, B4, R3 and B4 to the demultiplexer 500 via the output line YL2.

The data driver circuit 200 sequentially outputs data signals G5, G6, G5, G6, G5, G6, G5 and G6 to the demultiplexer 500 via the output line YL3.

The data driver circuit 200 sequentially outputs data signals R7, R7, R7 and R7 to the demultiplexer 500 via the output line YL4.

Referring to FIG. 2 and FIG. 5, the demultiplexer 500 outputs the data signals from the output lines YL0, YL1, YL2, YL3, and YL4 to the data lines DL0, DL1, DL3, DL5, and DL7 when the first switching signal CLA is at a low level.

The demultiplexer 500 outputs the data signals from the output lines YL1, YL2, and YL3 to the data lines DL2, DL4, and DL6 when the second switching signal CLB is at a low level.

Therefore, only the data signal B0 corresponding to the first color light may be provided to the data line DL0. The data signal B0 of the data line DL0 may be provided to the first-row pixel circuit PC10.

Only the data signal G1 corresponding to the second color light may be provided to the data line DL1. The data signal G1 of the data line DL1 may be provided to the second-row pixel circuit PC21.

Only the data signal G2 corresponding to the second color light may be provided to the data line DL2. The data signal G2 of the data line DL2 may be provided to the pixel circuits PC12 and PC22.

Only the data signal R3 corresponding to the third color light may be provided to the data line DL3. The data signal R3 of the data line DL3 may be provided to the pixel circuits PC13 and PC23.

Only the data signal B4 corresponding to the first color light may be provided to the data line DL4. The data signal B4 of the data line DL4 may be provided to the pixel circuits PC14 and PC24.

Only the data signal G5 corresponding to the second color light may be provided to the data line DL5. The data signal G5 of the data line DL5 may be provided to the pixel circuits PC15 and PC25.

Only the data signal G6 corresponding to the second color light may be provided to the data line DL6. The data signal G6 of the data line DL6 may be provided to the pixel circuits PC16 and PC26.

Only the data signal R7 corresponding to the third color light may be provided to the data line DL7. The data signal R7 of the data line DL7 may be provided to the pixel circuits PC17 and PC27.

The data signal corresponding to one color light is provided to each of the data lines DL0 to DL7, such that unnecessary charge/discharge operations on the data lines DL0 to DL7 are reduced. As a result, power consumption in the display panel DP may be minimized.

In each of the horizontal periods H1, H2, H3, and H4, the output line YL1 alternately outputs the data signals G1 and G2 corresponding to the second color light, and the output line YL3 alternately outputs the data signals G5 and G6 corresponding to the second color light. Therefore, unnecessary charge/discharge operations on the output lines YL1 and YL3 are reduced. Therefore, the power consumption of the data driver circuit 200 may be minimized.

The data driver circuit of the display device having the above configuration may output only one color data signal among the first to third color data signals to some output lines, and may alternately output the first color data signal and the second color data signal to the others of the output lines.

Only one data signal among the first to third color data signals is output to some output lines such that the power consumption of the display device may be reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a 0-th data line, a first data line, a second data line and a third data line sequentially arrange in a first direction;

a first pixel circuit and a second pixel circuit disposed in a first row and connected to the 0-th data line and the second data line, respectively;

a third pixel circuit and a fourth pixel circuit disposed in a second row and connected to the second data line and the third data line, respectively;

a first light-emitting element connected to the first pixel circuit via a first connection wiring which crosses at least one of the 0-th data line and the first data line;

a second light-emitting element connected to the second pixel circuit;

a third light-emitting element connected to the fourth pixel circuit via a second connection wiring; and a fourth light-emitting element connected to the third pixel circuit, wherein each of the second light-emitting element and the fourth light-emitting element emits light of the same color; and wherein the first light-emitting element, the second light-emitting element, and the third light-emitting element respectively emit light of different colors.

2. The electronic device of claim 1, wherein the 0-th data line, the first data line, the second data line and the third data line transmit a first color data signal, a second color data signal, a fourth color data signal and a third color data signal, respectively.

3. The electronic device of claim 2, further comprising a demultiplexer configured to connect a 0-th output line to the 0-th data line, configured to alternately connect a first output line to the first data line and the second data line, and configured to connect a second output line to the third data line in response to a switching signal.

4. The electronic device of claim 3, wherein the 0-th output line transmits the first color data signal corresponding to a first color light, wherein the first output line transmits the second color data signal corresponding to a second color light, and wherein the second output line transmits the third color data signal corresponding to a third color light.

5. The electronic device of claim 4, further comprising:

a fourth data line;

a fifth pixel circuit disposed in the second row and connected to the fourth data line;

a fifth light-emitting element connected to the fifth pixel circuit.

6. The electronic device of claim 5, wherein the demultiplexer is configured to alternately connect the second output line to the third data line and the fourth data line in response to the switching signal.

7. The electronic device of claim 6, wherein the fifth light-emitting element emits the first color light, and wherein the second output line alternately transmits the third color data signal and the first color data signal.

8. The electronic device of claim 2, wherein the second color data signal and the fourth color data signal correspond to same color light.

9. The electronic device of claim 1, wherein the 0-th data line and the first data line are disposed adjacent to the first pixel circuit, and wherein the second data line and third second data line are disposed adjacent to the second pixel circuit.

10. An electronic device comprising:

a 0-th data line, a first data line, a second data line and a third data line sequentially arranged in a first direction;

a 10-th pixel circuit, an 11-th pixel circuit, a 12-th pixel circuit and a 13-th pixel circuit disposed in a first row and connected to the 0-th data line, the first data line, the second data line and the third data line, respectively;

an 11-th light-emitting unit, a 12-th light-emitting unit and a 13-th light-emitting unit disposed in the first row, respectively;

a 21-th pixel circuit, a 22-th pixel circuit and a 23-th pixel circuit disposed in a second row and connected to the first data line, the second data line and the third data line, respectively, and a 21-th light-emitting unit, a 22-th light-emitting unit and a 23-th light-emitting unit disposed in the second row, respectively, wherein the 11-th light-emitting unit, the 12-th light-emitting unit and the 13-th light-emitting unit are connected to the 10-th pixel circuit, the 12-th pixel circuit and the 13-th pixel circuit, respectively, wherein the 22-th light-emitting unit and the 23-th light-emitting unit are connected to the 23-th pixel circuit and the 22-th pixel circuit, respectively, and wherein the 0-th data line exclusivel transmits a first color data signal, the first data line exclusively transmits a second color data signal, the second data line exclusively transmits a fourth color data signal and the third data line exclusively transmits a third color data signal, respectively.

11. The electronic device of claim 10, wherein the 11-th light-emitting unit emits a first color light, wherein each of the 12-th light-emitting unit, the 21-th light-emitting unit and the 23-th light-emitting unit emits a second color light, and wherein each of the 13-th light-emitting unit and the 22-th light-emitting unit emits a third color light.

12. The electronic device of claim 11, further comprising a demultiplexer configured to connect a 0-th output line to the 0-th data line, configured to alternately connect a first output line to the first data line and the second data line, and configured to connect a second output line to the third data line in response to a switching signal.

13. The electronic device of claim 12, further comprising:

a fourth data line;

a 24-th pixel circuit disposed in the second row and connected to the fourth data line; and a 24-th light-emitting element connected to the 24-th pixel circuit.

14. The electronic device of claim 13, wherein the demultiplexer is configured to alternately connect the second output line to the third data line and the fourth data line in response to the switching signal.

15. The electronic device of claim 14, wherein the 24-th light-emitting element emits the first color light, and wherein the second output line alternately transmits the third color data signal and the first color data signal.

16. The electronic device of claim 12, wherein the 0-th output line transmits the first color data signal corresponding to the first color light, wherein the first output line transmits the second color data signal corresponding to the second color light, and wherein the second output line transmits the third color data signal corresponding to the third color light.

17. The electronic device of claim 10, wherein the second color data signal and the fourth color data signal correspond to same color light.

18. The electronic device of claim 10, wherein the 0-th data line and the first data line are disposed between the 10-th pixel circuit and the 11-th pixel circuit, and wherein the second data line and third second data line are disposed between the 12-th pixel circuit and the 13-th pixel circuit.

19. An electronic device comprising:

a display panel comprising a 0-th data line, a first data line, a second data line and a third data line sequentially arranged in a first direction;

a data driver circuit electrically connected to a plurality of output lines; and a demultiplexer configured to electrically connect plurality of output lines to a portion of the 0-th data line, the first data line, the second data line and the third data line, wherein the display panel includes:

a 10-th pixel circuit, an 11-th pixel circuit, a 12-th pixel circuit and a 13-th pixel circuit sequentially disposed in a first row and connected to the 0-th data line, the first data line, the second data line and the third data line, respectively;

an 11-th light-emitting unit, a 12-th light-emitting unit and a 13-th light-emitting unit disposed in the first row, respectively;

a 21-th pixel circuit, a 22-th pixel circuit and a 23-th pixel circuit disposed in a second row and connected to the first data line, the second data line and the third data line, respectively, and a 21-th light-emitting unit, a 22-th light-emitting unit and a 23-th light-emitting unit sequentially disposed in the second row, respectively, wherein the 11-th light-emitting unit, the 12-th light-emitting unit and the 13-th light-emitting unit are connected to the 10-th pixel circuit, the 12-th pixel circuit and the 13-th pixel circuit, respectively, wherein the 22-th light-emitting unit and the 23-th light-emitting unit are connected to the 23-th pixel circuit and the 22-th pixel circuit, respectively, and wherein the 0-th data line exclusively transmits a first color ta signal, the first data line exclusively transmits a second color data signal, the second data line exclusively transmits a fourth color data signal and the third data line exclusively transmits a third color data signal, respectively.

20. The electronic device of claim 19, wherein the 11-th light-emitting unit emits a first color light, wherein each of the 12-th light-emitting unit, the 21-th light-emitting unit and the 23-th light-emitting unit emits a second color light, and each of the 13-th light-emitting unit and the 22-th light-emitting unit emits a third color light.

* * * * *